(12) United States Patent
Lee

(10) Patent No.: US 9,587,647 B2
(45) Date of Patent: Mar. 7, 2017

(54) ELECTRONIC WATER PUMP WITH COOLING UNIT FOR VEHICLES

(71) Applicant: NNN KOREA CO., LTD., Haman-gun, Gyeongsangnam-do (KR)

(72) Inventor: Seok Bu Lee, Changwon-si (KR)

(73) Assignee: NNN KOREA CO., LTD., Haman-gun, Gyeongsangnam-do (KR)

( * ) Notice: Subject to any disclaimer, the term of this patent is extended or adjusted under 35 U.S.C. 154(b) by 207 days.

(21) Appl. No.: 14/421,421

(22) PCT Filed: Jun. 21, 2013

(86) PCT No.: PCT/KR2013/005501
§ 371 (c)(1),
(2) Date: Feb. 12, 2015

(87) PCT Pub. No.: WO2014/181917
PCT Pub. Date: Nov. 13, 2014

(65) Prior Publication Data
US 2015/0184674 A1    Jul. 2, 2015

(30) Foreign Application Priority Data

May 9, 2013  (KR) .................. 10-2013-0052683

(51) Int. Cl.
*F04D 29/58* (2006.01)
*F04D 13/06* (2006.01)
(Continued)

(52) U.S. Cl.
CPC ............ *F04D 29/5893* (2013.01); *F01P 5/10* (2013.01); *F04D 13/0606* (2013.01);
(Continued)

(58) Field of Classification Search
CPC .. F04D 13/06; F04D 13/0606; F04D 13/0686; F04D 13/0626; F04D 29/58;
(Continued)

(56) References Cited

U.S. PATENT DOCUMENTS 5,223,757 A * 6/1993 Staub ................. H02K 9/19
310/54
6,986,648 B2  1/2006 Williams et al.
(Continued)

FOREIGN PATENT DOCUMENTS

EP       1361368 A2    11/2003
EP       1503083 A1    2/2005
(Continued)

*Primary Examiner* — Theodore Stigell
*Assistant Examiner* — Chirag Jariwala
(74) *Attorney, Agent, or Firm* — Novick, Kim & Lee, PLLC; Jae Youn Kim

(57) ABSTRACT

Disclosed herein is an electronic water pump for vehicles. The electronic water pump includes an inner motor casing (150), a rotor (160) and a cooling unit (170). A shaft (152) is installed in an insert hole (151) of the inner motor casing, and a stator (140) is fitted over the inner motor casing. The inner motor casing has a depression (153) and at least one through hole (156). The rotor is disposed in the insert hole (151) so as to be rotatable around the shaft (152). A permanent magnet (162) is provided in the rotor. The cooling unit includes an upper cooling plate which is fitted over the rotor and is seated into the depression, at least one cooling pin which is coupled to the upper cooling plate and inserted into the through hole, and a lower cooling plate which is coupled to a lower end of the cooling pin.

8 Claims, 14 Drawing Sheets

(51) Int. Cl.
    *F04D 29/42*       (2006.01)
    *H02K 9/22*        (2006.01)
    *F01P 5/10*        (2006.01)

(52) U.S. Cl.
    CPC ..... *F04D 13/0626* (2013.01); *F04D 13/0686* (2013.01); *F04D 29/426* (2013.01); *F04D 29/588* (2013.01); *F04D 29/5813* (2013.01); *H02K 9/22* (2013.01)

(58) Field of Classification Search
    CPC ............... F04D 29/5806; F04D 29/586; F04D 29/5866; F04D 29/588; F04D 29/5813; F04D 29/5893; F04D 29/426; H02K 9/00; H02K 9/005; H02K 9/22
    USPC .................................... 417/423.8; 310/52–64
    See application file for complete search history.

(56) References Cited

U.S. PATENT DOCUMENTS

| | | | | |
|---|---|---|---|---|
| 8,277,181 B2 * | 10/2012 | Hein | ..................... | F04D 29/043 |
| | | | | 415/229 |
| 2011/0058966 A1 * | 3/2011 | Cunningham | .......... | F04D 13/10 |
| | | | | 417/410.1 |
| 2011/0285339 A1 * | 11/2011 | Hyde | ....................... | H02K 9/19 |
| | | | | 318/473 |
| 2012/0183421 A1 * | 7/2012 | Kim | ....................... | F04D 13/06 |
| | | | | 417/423.7 |

FOREIGN PATENT DOCUMENTS

| KR | 10-2011-0055281 A | 5/2011 |
|---|---|---|
| KR | 10-2012-0050239 A | 5/2012 |

\* cited by examiner

ELECTRONIC WATER PUMP WITH COOLING UNIT FOR VEHICLES

TECHNICAL FIELD

The present invention relates, in general, to electronic water pumps with cooling units for vehicles and, more particularly, to an electronic water pump with a cooling unit for vehicles which is configured such that heat of cooling water which circulates through a pump casing is conducted from an upper cooling plate that makes direct contact with the cooling water to a lower cooling plate through a plurality of cooling pins, whereby the temperatures of the stator and the control board can be maintained at appropriate levels, thus preventing the stator and the control board from deteriorating due to high-temperature heat, and enhancing the efficiency of an engine.

BACKGROUND ART

Generally, water pumps are mainly mechanical water pumps which are connected to crankshaft pulleys of engines by belts and are operated by the driving force (engine driving force) of the crankshafts. However, because mechanical water pumps are operated along with rotation of engines, engine cooling cannot be independently controlled under optimum conditions. In addition, mechanical water pumps may increase the engine load, thus reducing the fuel efficiency of a vehicle. Further, the peripheral structure of an engine is complicated, and the volume thereof is increased.

In an effort to overcome the problems of such mechanical water pumps, an electronic water pump was introduced. Unlike the mechanical water pumps, a power source of the electronic water pump is a battery, and variable control is possible because it is operated by an electric motor using electric power. Therefore, engine cooling can be controlled under optimum conditions. An engine load can be reduced, and the peripheral structure of the engine can be simplified, and the fuel efficiency of the vehicle can be enhanced.

Particularly, in the case of environment-friendly EVs (electric vehicles), they have no engine which functions to distribute power, unlike typical internal combustion engines. Thus, a water pump which is provided to cool a drive motor, an inverter, a converter, different kinds of electronic controllers, etc. must be operated by electricity. Further, among vehicles having typical internal combustion engines, in the case of vehicles using ISG (idle stop & go) systems which are provided to enhance fuel efficiency and reduce discharge of exhaust gas, because the operation of an engine is automatically interrupted when the vehicle stops, (for example, while waiting for signal) an auxiliary electronic water pump which circulates engine cooling water for the purpose of heating a passenger compartment is essential.

Furthermore, unlike mechanical water pumps, electronic water pumps include a control board to control an electric motor. Different kinds of electronic components are mounted on the control board to control rotation of a rotating body. A temperature at which the electronic components can be normally operated is 120° C. or less. However, a temperature of a peripheral portion of the engine where the electronic water pump is disposed is about 150° C.

Under such high-temperature conditions, heat dissipation of the control board of the electronic water pump and a stator of the motor is a very important factor in enhancing the performance.

Recently several techniques that pertain to such heat dissipation were proposed. In Patent document 1 (EP 1 503083 A1), referring to FIG. 1, a control board 20 is installed in a lower end of a motor casing 22, and cooling water passes through a BLDC (brushless DC) motor so that heat generated from the control board 20 can be dissipated.

However, in Patent document 1, the flow of cooling water which circulates through the BLDC motor is not smooth. If some of cooling water stagnates in the motor casing 22, the temperature of the control board 20 may rather increase.

In Patent document 2 (EP 1 361368 B1), referring to FIG. 2, a housing 20 that has a control board 22 therein is disposed at a side of a motor casing 14. A separate cooling water path B is formed between the housing 20 and the motor casing 14 to maximize heat dissipation performance of the control board 22.

However, in Patent document 2, because the separate cooling water path B must be formed for heat dissipation of the control board 22, the entire structure is complex, and there are difficulties in machining, assembly and installation. In addition, technical realization is limited because of difficulty in manufacturing.

DISCLOSURE

Technical Problem

Accordingly, the present invention has been made keeping in mind the above problems occurring in the prior art, and an object of the present invention is to provide an electronic water pump with a cooling unit for vehicles which is configured such that heat of cooling water which circulates through a pump casing is transferred to a cooling unit, that is, heat of cooling water is conducted from an upper cooling plate to a lower cooling plate through cooling pins, whereby the temperatures of a stator and a control board which controls the stator can be maintained at appropriate temperatures, thus preventing the stator and the control board from deteriorating due to high-temperature heat, thereby enhancing the efficiency of the engine and facilitating the assembly and installation of the cooling unit in the water pump.

Another object of the present invention is to provide an electronic water pump with a cooling unit for vehicles in which a rotor is formed in such a way that a permanent magnet is installed in the rotor, and a cover provided with vanes, an impeller and a lower cover are integrated with each other by fusing, and the permanent magnet strongly reacts to a magnetic field formed from a stator which surrounds the rotor, whereby the rotor is rotated, wherein while the vanes rotate, the cooling water continuously circulates the water pump, and by virtue of strong magnetic force overcoming flow resistance of the cooling water, there is no possibility of the rotor and the stator being desynchronized from each other, so that superior torque performance of a BLDC motor can be maintained, and the durability thereof and heat dissipation performance of the stator can be enhanced.

A further object of the present invention is to provide an electronic water pump with a cooling unit for vehicles in which first O-rings are respectively provided in upper and lower ends of a through hole, and a second O-ring is coupled to a pump casing and provided on a circumferential outer surface of an inner motor casing which is disposed in an outer motor casing, whereby sealing between the upper and lower ends of the inner motor casing can be maintained, and cooling water can be prevented from entering the stator of the BLDC motor or a control board, thus enhancing the safety.

Technical Solution

In order to accomplish the above objects, the present invention provides an electronic water pump for vehicles, having a pump casing through which cooling water passes, an outer motor casing coupled to a lower end of the pump casing, with a stator installed in the outer motor casing, and a motor cover coupled to a lower end of the outer motor casing, with a control board installed in the motor cover, the control board controlling the stator, the electronic water pump including: an inner motor casing provided in the outer motor casing, with a shaft installed upright in a center of an insert hole formed in an upper surface of the inner motor casing, and a ring-shaped stator fitted over a circumferential outer surface of a lower end of the inner motor casing, the inner motor casing having a depression formed in an upper surface thereof, and at least one through hole formed vertically through the inner motor casing in an outer portion of the depression; a rotor disposed in the insert hole so as to be rotatable around the shaft, with a permanent magnet provided in the rotor; and a cooling unit comprising an upper cooling plate fitted over a circumferential outer surface of the rotor, the upper cooling plate being seated into the depression, at least one cooling pin coupled to an outer portion of the upper cooling plate, the cooling pin being inserted into the through hole and disposed in the outer motor casing, and a lower cooling plate coupled to a lower end of the cooling pin.

The rotor may include: a rotor body formed in a sleeve shape, the rotor body comprising a permanent magnet disposed in an insert depression formed in a lower surface of the rotor body, and a stopper fused to a the lower end of the rotor body to close the insert depression; a cover provided with a plurality of vanes, the cover being integrally coupled to the rotor body in such a way that the vanes are fused to an upper surface of the rotor body; and a bushing having a sleeve shape and provided in a circumferential inner surface of the rotor body.

Upper and lower ends of the cooling pin may be respectively fixed to the upper cooling plate and the lower cooling plate by calking or riveting.

The cooling pin may have a hollow structure.

The cooling pin may comprise a pole having a circular, polygonal or elliptical shape.

The electronic water pump may include: first O-rings respectively provided in upper and lower ends of the through hole; and a second O-ring provided around the circumferential outer surface of the inner motor casing.

The cooling unit may be made of copper or a material having a thermal conductivity equal to or higher a thermal conductivity of copper.

The fusion may comprise ultrasonic fusion, high-frequency fusion or thermal fusion.

Advantageous Effects

In an electronic water pump with a cooling unit for vehicles according to the present invention, heat of cooling water which circulates through a pump casing is transferred to a cooling unit, that is, heat of cooling water is conducted from an upper cooling plate to a lower cooling plate through cooling pins. Thereby, the temperatures of a stator and a control board which controls the stator can be maintained at appropriate temperatures, thus preventing the stator and the control board from deteriorating due to high-temperature heat, thereby enhancing the efficiency of the engine. Furthermore, the present invention is configured such that assembly and installation of the cooling unit in the water pump can be facilitated.

Furthermore, a rotor is formed in such a way that a permanent magnet is installed in the rotor, and a cover provided with vanes, an impeller and a lower cover are integrated with each other by fusing. The permanent magnet strongly reacts to a magnetic field formed from a stator which surrounds the rotor, whereby the rotor is rotated. While the vanes rotate, the cooling water continuously circulates the water pump. By virtue of strong magnetic force overcoming flow resistance of the cooling water, there is no possibility of the rotor and the stator being desynchronized from each other. Therefore, superior torque performance of a BLDC motor can be maintained, and the durability thereof can be enhanced. Furthermore, heat dissipation performance of the stator In addition, first O-rings are respectively provided in upper and lower ends of a through hole, and a second O-ring is coupled to a pump casing and provided on a circumferential outer surface of an inner motor casing which is disposed in an outer motor casing.

Thereby, a seal between the upper and lower ends of the inner motor casing can be maintained, and cooling water can be prevented from entering the stator of the BLDC motor or a control board, thus enhancing the safety.

BEST MODE

Figure 1:
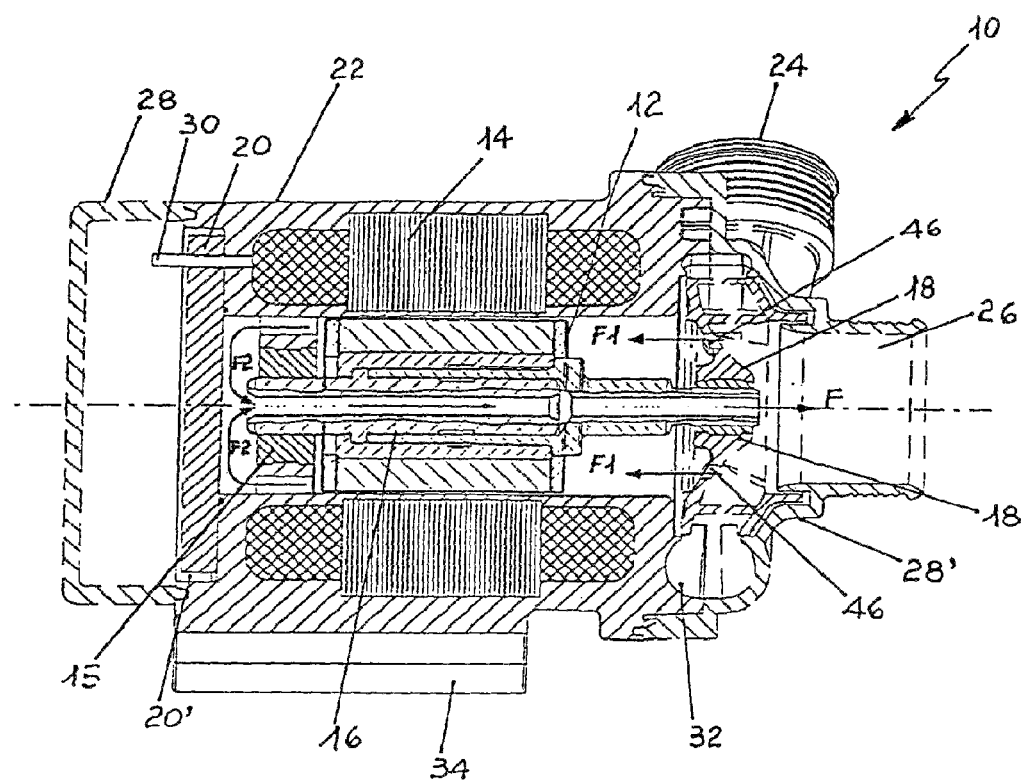
FIG. 1 is a sectional view of a water pump of Patent document 1.
Figure 2:
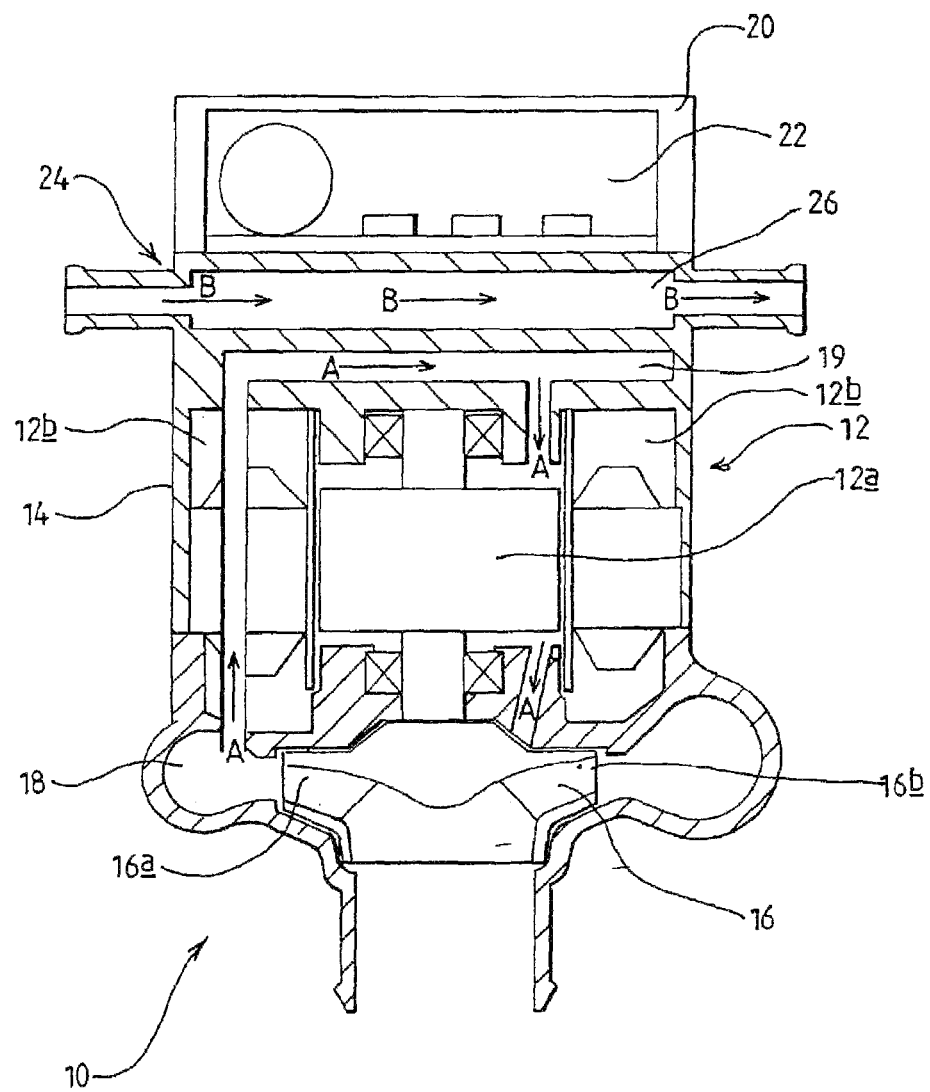
FIG. 2 is a sectional view of a water pump of Patent document 2.

The above and other objects, features and advantages of the present invention will be more clearly understood from the following detailed description taken in conjunction with the accompanying drawings. The present invention is not limited to the following embodiments, and various modifications are possible. The embodiments are only for illustrative purposes to enable those skilled in this art to easily understand the scope of the present invention. The scope of the present invention must be defined by the accompanying claims. The same reference numerals are used throughout the different drawings to designate the same or similar components.

Hereinafter, an electronic water pump with a cooling unit for vehicles according to a preferred embodiment of the present invention will be described in detail with reference to the attached drawings.

Figure 3:
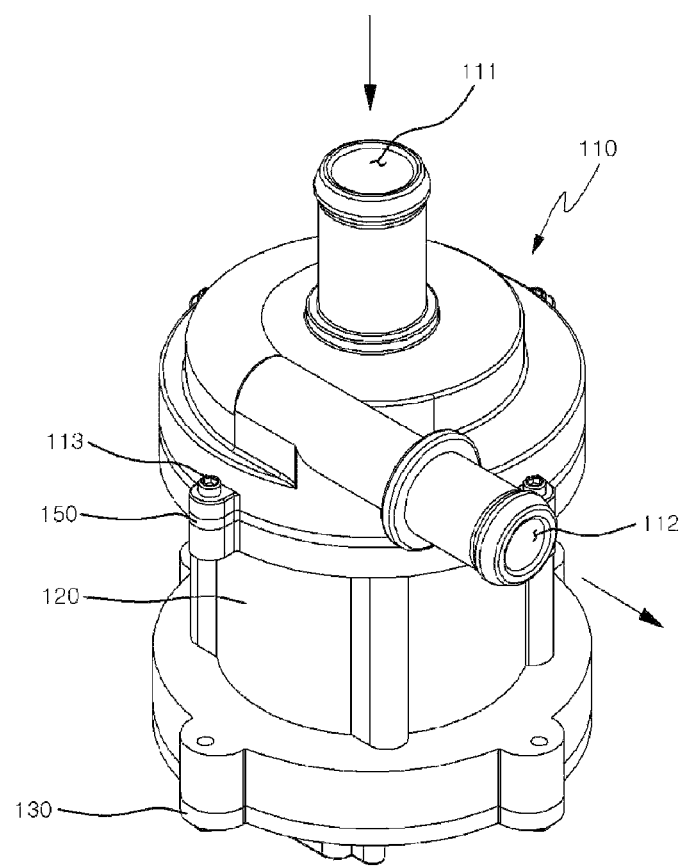
FIG. 3 is a perspective view illustrating an electronic water pump with a cooling unit for vehicles, according to a preferred embodiment of the present invention.
Figure 4:
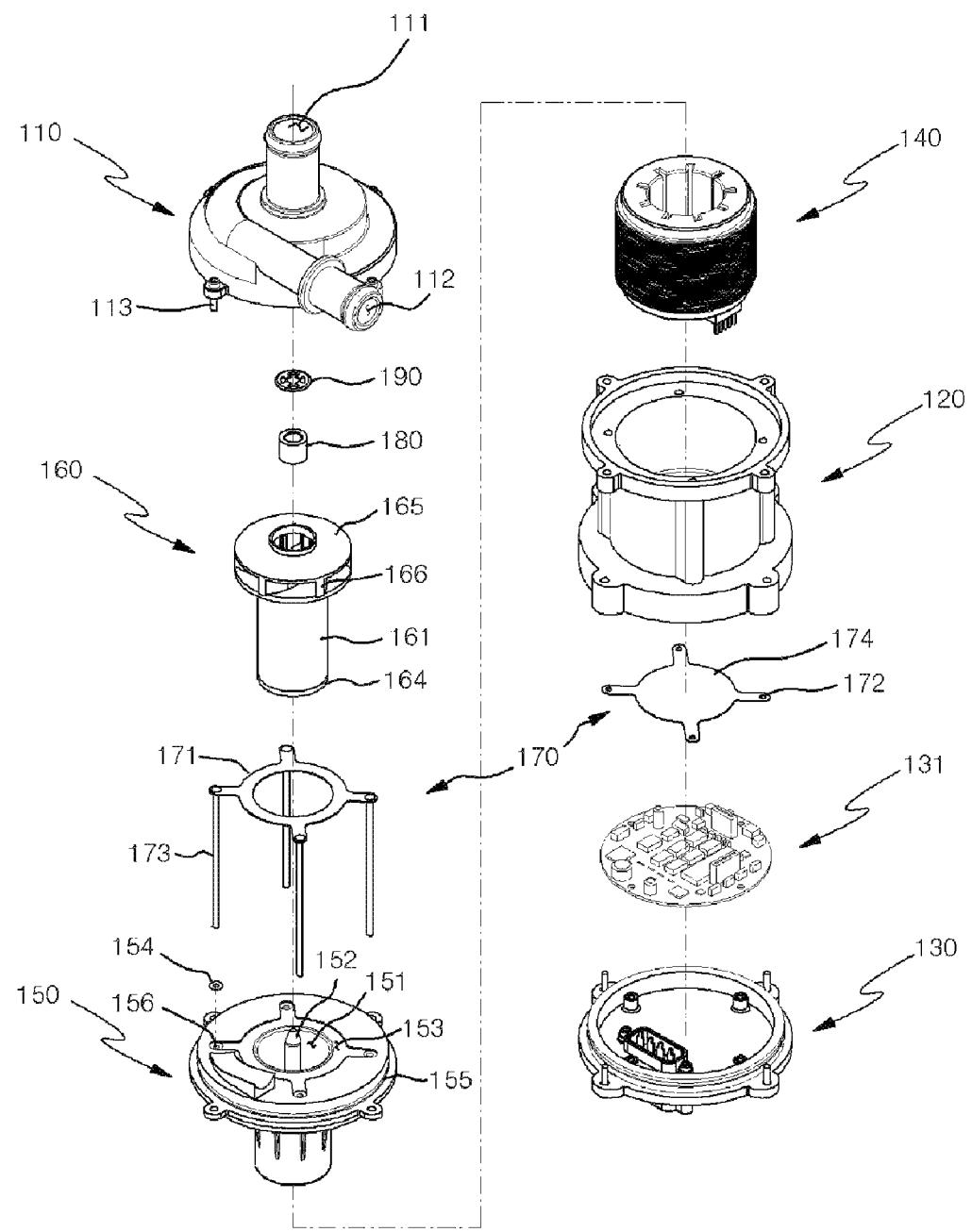
FIG. 4 is an exploded perspective view illustrating the electronic water pump with the cooling unit for vehicles according to the preferred embodiment of the present invention.
Figure 5:
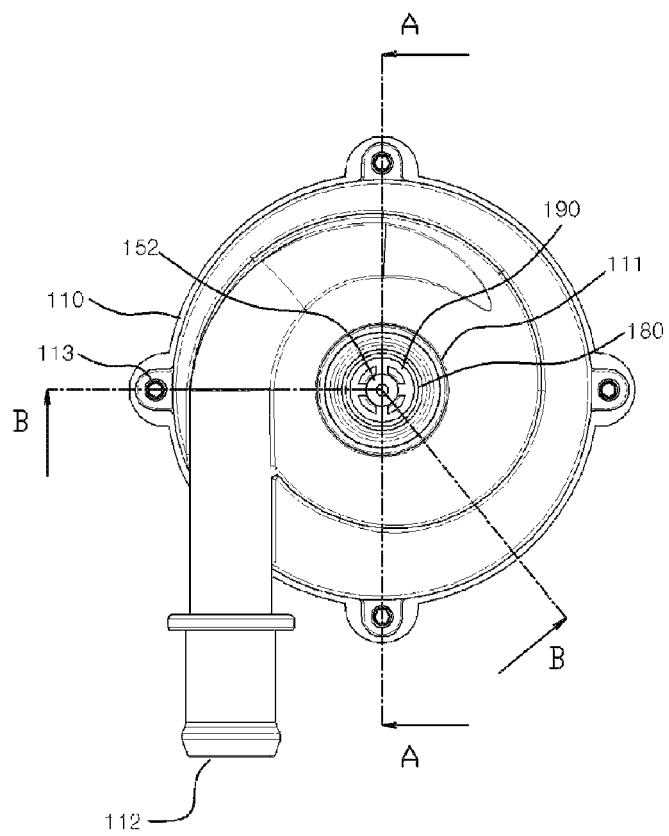
FIG. 5 is a plan view of the electronic water pump with the cooling unit for vehicles, according to the preferred embodiment of the present invention.
Figure 6:
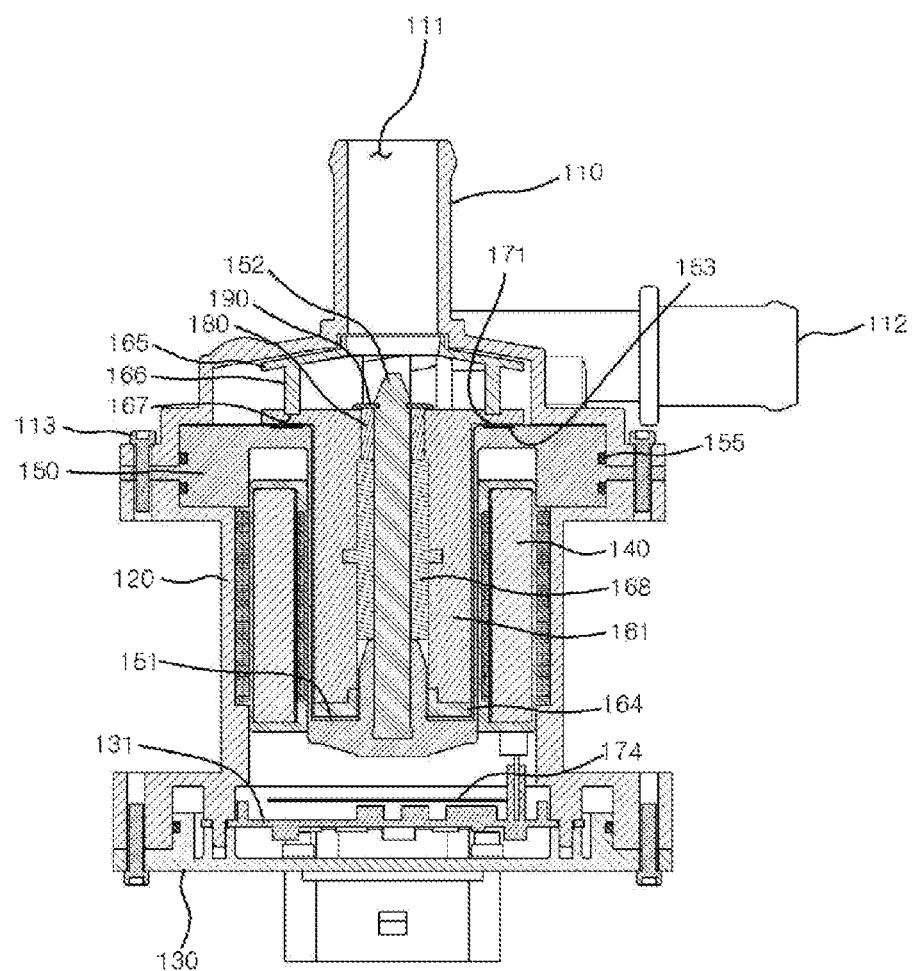
FIG. 6 is a sectional view taken along line A-A of FIG. 5.
Figure 7:
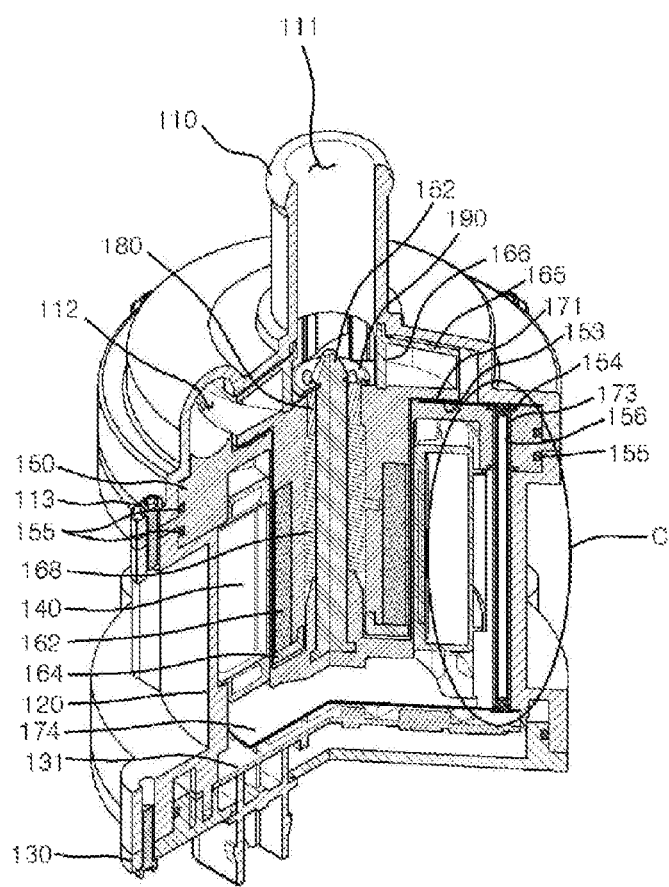
FIG. 7 is a perspective sectional view taken along line B-B of FIG. 5.
Figure 8:
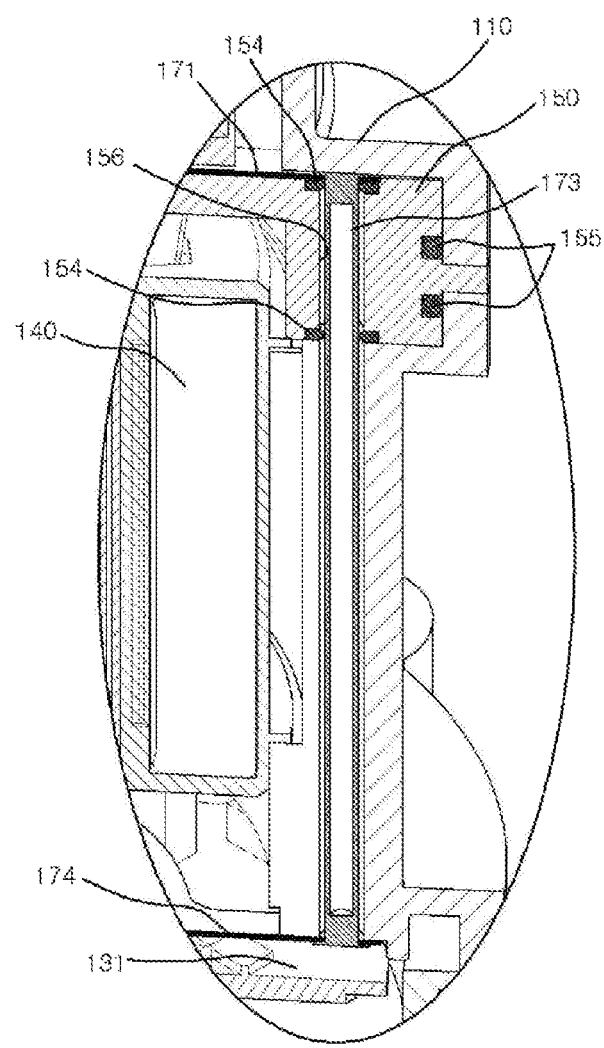
FIG. 8 is an enlarged view of portion C of FIG. 7.

FIG. 3 is a perspective view illustrating the electronic water pump with the cooling unit for vehicles according to the preferred embodiment of the present invention. FIG. 4 is an exploded perspective view illustrating the electronic water pump with the cooling unit for vehicles according to the preferred embodiment of the present invention. FIG. 5 is a plan view of the electronic water pump with the cooling unit for vehicles, according to the preferred embodiment of the present invention. FIG. 6 is a sectional view taken along line A-A of FIG. 5. FIG. 7 is a perspective sectional view taken along line B-B of FIG. 5. FIG. 8 is an enlarged view of portion C of FIG. 7.

Referring to FIGS. 3 through 8, the electronic water pump with the cooling unit for vehicles according to the present invention includes a pump casing 110, an outer motor casing 120 and a motor cover 130 which are successively stacked on top of one another and coupled to each other.

The pump casing 110 has a hollow structure, and a rotor 160 is rotatably disposed in the pump casing 110. An inlet 111 is formed in an upper end of the pump casing 110 so that cooling water is drawn into the pump casing 110 through the inlet 111. An outlet 112 is formed in a predetermined portion of a side surface of the pump casing 110 so that cooling water that has been drawn through the inlet 111 is discharged from the pump casing 110 through the outlet 112.

That is, when the rotor 160, which is installed in an inner motor casing 150 which will be explained later herein, is rotated, cooling water is drawn into the inlet 111 of the pump casing 110 and then discharged out of the pump casing 110 through the outlet 112 by vanes 166.

The outer motor casing 120 is formed by injection molding using aluminum or engineering plastic (PPS). Preferably, the outer motor casing 120 is coupled with a seal to a lower end of the pump casing 110.

The inner motor casing 150 is disposed between the pump casing 110 and the outer motor casing 120. The pump casing 110, the outer motor casing 120 and the inner motor casing 150 are integrally coupled to each other by means of fasteners 113.

Furthermore, the rotor 160, the cooling unit 170, the inner motor casing 150 and a stator 140 are installed in the outer motor casing 120.

The motor cover 130 is coupled with a seal to a lower end of the outer motor casing 120. A control board 131 which controls the stator 140 is installed in the motor cover 130.

The control board 131 that is fixed in the motor cover 130 is electrically connected to the stator 140.

Hereinafter, the rotor 160, the cooling unit 170, the inner motor casing 150 and the stator 140 which are installed in the outer motor casing 120 will be explained in detail.

The stator 140 is provided with different kinds of sensors and is electrically connected to the control board 131. The stator 140 which has a ring shape forms a rotating field based on an electric signal of the control board 131 and rotates a permanent magnet 162, which will be explained later herein, in the same manner as that of a BLDC motor. The rotor 160 in which the permanent magnet 162 is installed is rotated along with the permanent magnet 162.

Figure 9:
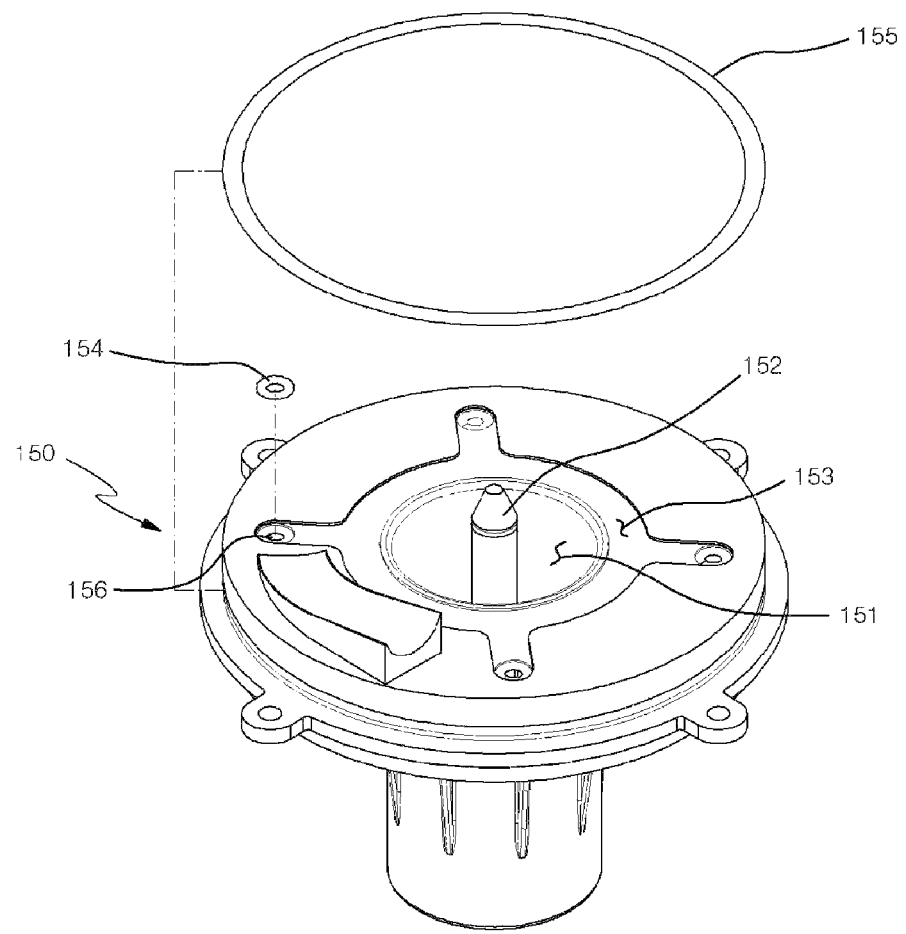
FIG. 9 is a perspective view showing an inner motor casing of the electronic water pump with the cooling unit for vehicles according to the preferred embodiment of the present invention.
Figure 10:
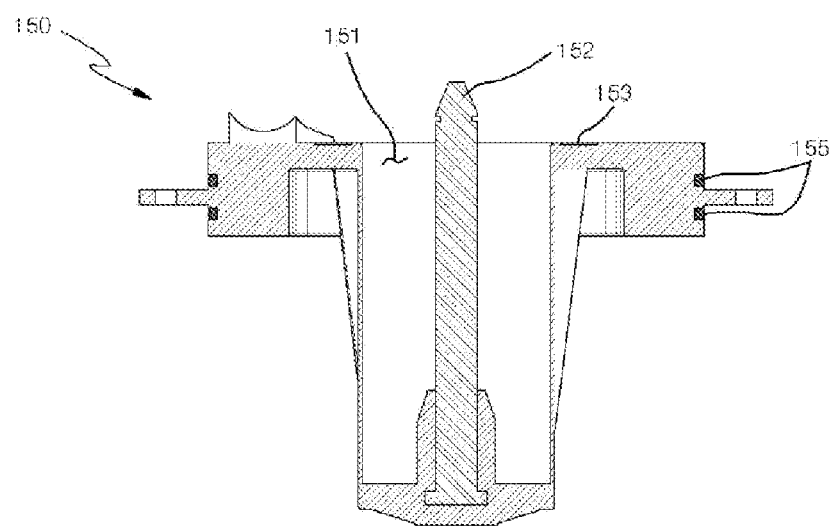
FIG. 10 is a sectional view of the inner motor casing of the electronic water pump with the cooling unit for vehicles according to the preferred embodiment of the present invention.

FIG. 9 is a perspective view showing the inner motor casing of the electronic water pump with the cooling unit for vehicles according to the preferred embodiment of the present invention. FIG. 10 is a sectional view of the inner motor casing of the electronic water pump with the cooling unit for vehicles according to the preferred embodiment of the present invention.

Referring to FIGS. 9 and 10, the inner motor casing 150 is formed by injection molding using engineering plastic (PPS).

The pump casing 110 is coupled to an upper end of the inner motor casing 150, and space therebetween is sealed by a second O-ring 155. The outer motor casing 120 is coupled to a lower end of the inner motor casing 150 in such a way that space therebetween is sealed by a second O-ring 155. Thereby, cooling water which is drawn into the pump casing 110 and then discharged therefrom can be prevented from entering the stator 140 which is provided around a circumferential outer surface of the lower end of the inner motor casing 150.

As such, the inner motor casing 150 is coupled with a seal to the pump casing 110 and the outer motor casing 120 by the second O-rings 155 and a first O-ring 154 which will be explained later herein, thus forming a waterproof coupling structure in which the stator 140 is separated from the rotor 160. Thereby, space between the upper and lower ends of the inner motor casing 150 is sealed, and cooling water is prevented from entering the lower end of the inner motor casing 150, whereby airtightness of the stator 140 and the control board 131 can be maintained, thus preventing the stator 140 or the control board 131 from being damaged by cooling water.

Furthermore, an insert hole 151 is formed in an upper surface of the inner motor casing 150, and a shaft 152 made of metal is installed upright in the center of the insert hole 151. A body 161 of the rotor 160 is disposed in the insert hole 151 so as to be rotatable around the shaft 152.

The ring-shaped stator 140 is fitted over the circumferential outer surface of the lower end of the inner motor casing 150.

In other words, the inner motor casing 150 is installed in the outer motor casing 120 with the rotor 160 installed in the insert hole 151 of the inner motor casing 150 and the stator 140 fitted over the circumferential outer surface of the inner motor casing 150.

Furthermore, a seating depression 153 is formed in an upper surface of the inner motor casing 150. At least one vertical through hole 156 is formed in the inner motor casing 150 around the seating depression 153.

Preferably, a plurality of through holes 156 is formed in the inner motor casing 150. A cooling pin 173 which will be explained later herein is inserted into each through hole 156. First O-rings 154 are respectively coupled to upper and lower ends of each through hole 156.

The first O-rings 154 function to prevent cooling water from entering the stator 140 or the control board 131 through the through hole 156 (refer to FIG. 8).

Figure 11:
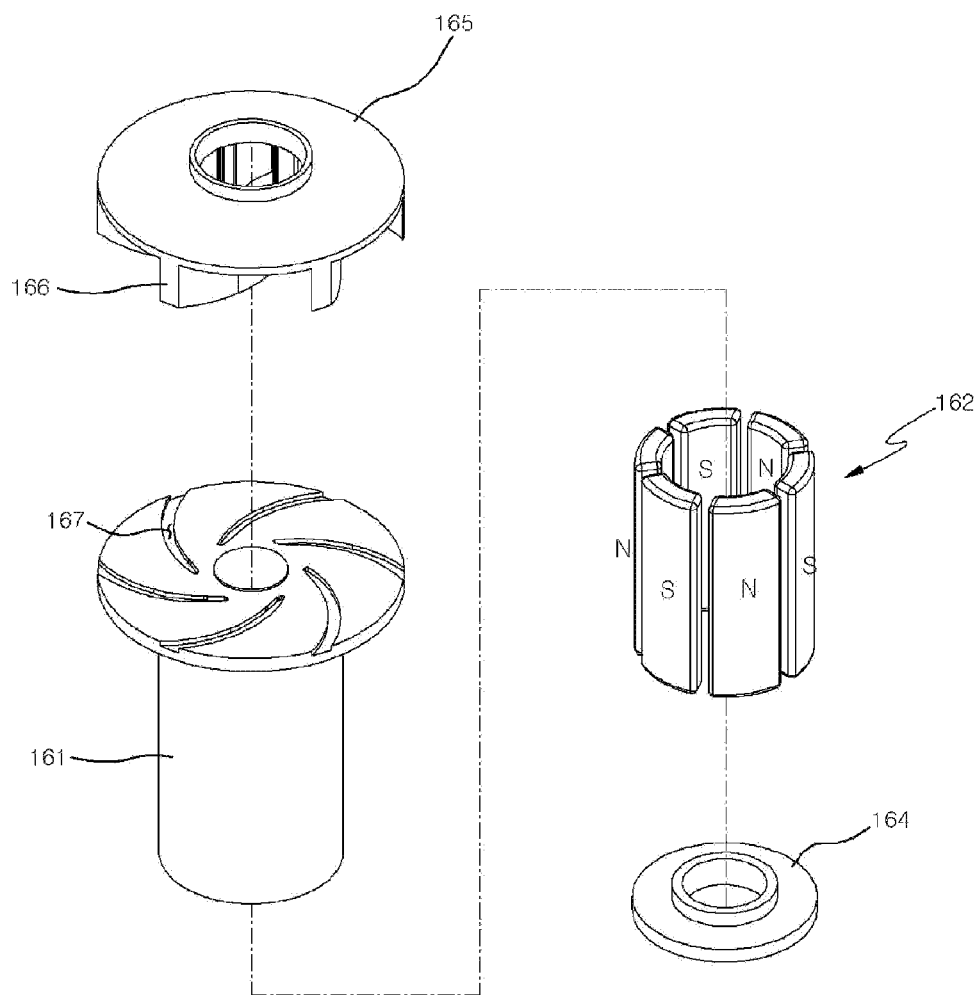
FIG. 11 is an exploded perspective view showing a rotor of the electronic water pump with the cooling unit for vehicles according to the preferred embodiment of the present invention.
Figure 12:
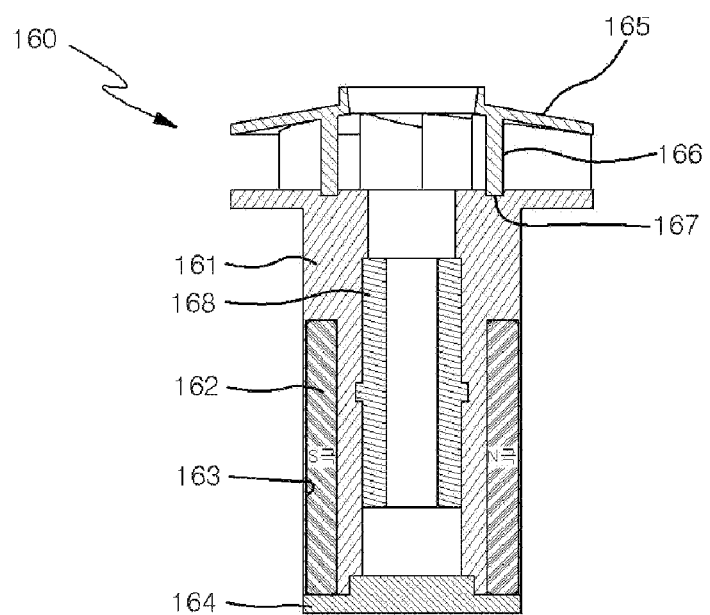
FIG. 12 is a sectional view showing the rotor of the electronic water pump with the cooling unit for vehicles according to the preferred embodiment of the present invention.

FIG. 11 is an exploded perspective view showing the rotor of the electronic water pump with the cooling unit for vehicles according to the preferred embodiment of the present invention. FIG. 12 is a sectional view showing the rotor of the electronic water pump with the cooling unit for vehicles according to the preferred embodiment of the present invention.

Referring to FIGS. 11 and 12, the rotor 160 is disposed in the insert hole 151 so as to be rotatable around the shaft 152. The permanent magnet 162 is disposed in the rotor 160.

The rotor 160 will be explained in more detail. The rotor 160 is formed in a sleeve shape so that the shaft 152 can be inserted into the rotor 160.

The rotor 160 includes the rotor body 161, a cover 165 and a bushing 168.

The rotor body 161 has a sleeve shape. An upper surface of the rotor body 161 is planar so that the vanes 166 can be fused to the upper surface of the rotor body 161. An insert depression 163 is formed in a lower end of the rotor body 161, and the permanent magnet 162 is disposed in the insert depression 163. A stopper 164 is fused to the lower end of the rotor body 161 to close the insert depression 163. In other words, the permanent magnet 162 is disposed in the rotor body 161, and then the stopper 164 is fused to the lower end of the rotor body 161 to prevent the permanent magnet 162 from being removed from the insert depression 163. The rotor body 161 and the stopper 164 are integrated into a single body by fusing.

Furthermore, attaching grooves 167 are formed in the upper surface of the rotor body 161. Preferably, the number of attaching grooves 167 and the shape thereof correspond to those of the vanes 166 that are attached to the cover 165 which will be explained later herein, so that the vanes 166 can be seated into the corresponding attaching grooves 167.

It is preferable that the permanent magnet 162 be a neodymium-based magnet or a sintered ferrite magnet which can rotate with respect to the rotating field of the stator 140. Furthermore, the permanent magnet 162 can be formed in a variety of shapes, for example, a segment type, a cylindrical type, etc.

The vanes 166 are attached to a lower surface of the cover 165. Preferably, the vanes 166 are preferably fused to the lower surface of the cover 165 in such a way that outlet angle of the vanes 166 ranges from 20° to 35°.

The vanes 166 of the cover 165 are fused to an upper surface of the rotor body 161. Here, the vanes 166 are seated into the corresponding attaching grooves 167 so that the naves 166 can be reliably and integrally fused to the rotor body 161.

The rotor 160 is configured such that the rotor body 161, the stopper 164, the vanes 166 and the cover 165 are fused to each other to have a single body, and the outlet angle of the vanes 166 ranges from 20° to 35°. As such, the construction of the rotor 160 is simplified, and the strong magnetic characteristics of the rotor 160 with respect to the stator 140 can be maintained. Furthermore, because cooling water can be smoothly discharged to the outside through the outlet 112, flow loss of cooling water can be minimized and the axial thrust force can be reduced.

Preferably, the above-mentioned fusion is one selected from among ultrasonic fusion, high-frequency fusion and thermal fusion, and the fusion method is not limited to a special method.

The bushing 168 has a sleeve shape and is installed on a circumferential inner surface of a hollow hole of the rotor body 161.

The damping bearing 180 is provided around the shaft 152 such that the rotor 160 is rotatably coupled to the shaft 152. A lower end of the damping bearing 180 is supported on an upper end of the bushing 168.

The lock washer 190 is disposed on the damping bearing 180 and fixed to an upper end of the shaft 152 to prevent the rotor 160 and the damping bearing 180 from being removed from the shaft 152.

Figure 13:
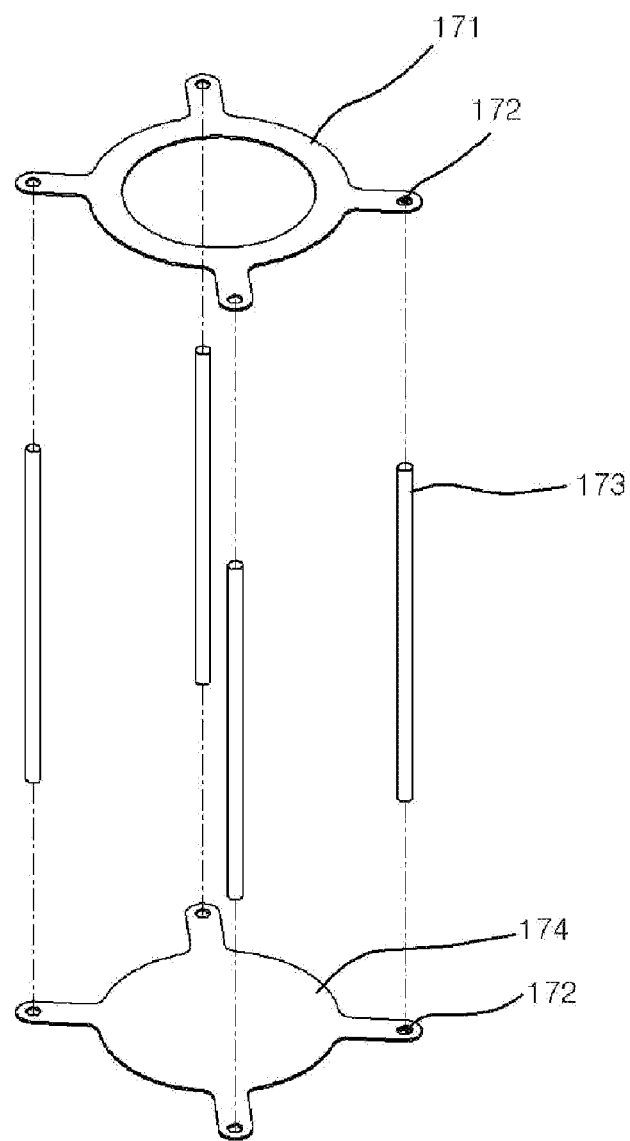
FIG. 13 is an exploded perspective view showing the cooling unit of the electronic water pump for vehicles according to the preferred embodiment of the present invention.
Figure 14:
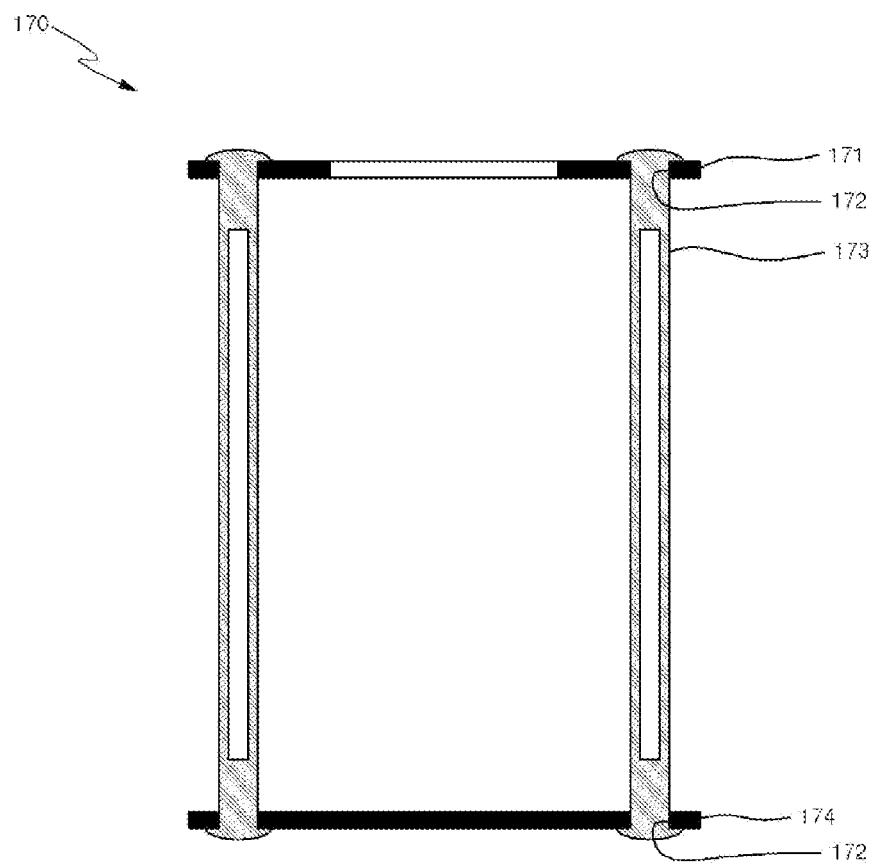
FIG. 14 is a sectional view showing the cooling unit of the electronic water pump for vehicles according to the preferred embodiment of the present invention.

FIG. 13 is an exploded perspective view showing the cooling unit of the electronic water pump for vehicles according to the preferred embodiment of the present invention. FIG. 14 is a sectional view showing the cooling unit of the electronic water pump for vehicles according to the preferred embodiment of the present invention.

Referring to FIGS. 13 and 14, the cooling unit 170 is made of copper or material that has thermal conductivity equal to or higher than that of copper. The cooling unit 170 includes an upper cooling plate 171, cooling pins 173 and a lower cooling plate 174.

The upper cooling plate 171 is seated into the seating depression 153 of the inner motor casing 150. Coupling holes 172 are formed in the perimeter of the upper cooling plate 171 so that upper ends of the cooling pins 173 are fitted into the corresponding coupling holes 172.

Heat of cooling water drawn into the inlet 111 of the pump casing 110 is conducted to the upper cooling plate 171, and the conducted heat is conducted to the cooling pins 173 connected to the perimeter of the upper cooling plate 171.

The one or more cooling pins 173 are coupled to the perimeter of the lower cooling plate 174. The cooling pins 173 are inserted into the respective through holes 156 and pass through the outer motor casing 120.

Heat of cooling water is conducted from the upper cooling plate 171 to the cooling pins 173, and the conducted heat is conducted to the lower cooling plate 174 coupled to the lower ends of the cooling pins 173.

Here, the upper and lower ends of the cooling pins 173 are fastened, by calking or riveting, to the coupling holes 172 that are formed in the upper and lower cooling plates 171 and 174.

Each cooling pin 173 has a hollow structure.

Furthermore, each cooling pin 173 can be a pole of a variety of shapes, for example, a circular, polygonal or elliptical pole shape.

The cooling pins 173 are inserted into the respective through holes 156 and are disposed in and coupled to the outer motor casing 120. Thus, heat that is conducted from the upper cooling plate 171 is conducted to the lower cooling plate 174, and the stator 140 is simultaneously cooled by the conducted heat.

The cooling pins 173 pass through the motor casing 120 and are coupled to the motor casing 120 in such a way that the cooling pins 173 surround a circumferential outer surface of the stator 140. Preferably, each cooling pin 173 can have a hollow pole of a variety of shapes to increase an area involved in heat exchange so that heat can be efficiently exchanged between the cooling pin 173 and the outer motor casing 120. Furthermore, it is preferable that several cooling pins 173 be provided so that the stator 140 can be more effectively cooled.

The lower cooling plate 174 is coupled to the lower ends of the cooling pins 173 and is disposed between the stator 140 and the control board 131.

Coupling holes 172 are formed in the perimeter of the lower cooling plate 174 so that the lower ends of the cooling pins 173 are inserted into the coupling holes 172 of the lower cooling plate 174.

Furthermore, the heat of cooling water is conducted from the cooling pins 173 to the lower cooling plate 174, and the conducted heat enables the temperatures of the stator 140 and the control board 131 to be maintained below an appropriate temperature, that is, 120° C., below which the stator 140 and the control board 131 can be reliably operated.

As described above, in the electronic water pump provided with the cooling unit for vehicles according to the present invention, heat of cooling water which circulates through the pump casing 110 is transferred to the cooling unit 170, that is, heat of cooling water is conducted from the upper cooling plate 171 to the lower cooling plate 174 through the cooling pins 173. Thereby, the temperatures of the stator 140 and the control board 131 which controls the stator 140 can be maintained at appropriate temperatures, thus preventing the stator 140 and the control board 131 from deteriorating due to high-temperature heat, thereby enhancing the efficiency of the engine. Furthermore, the present invention is configured such that assembly and installation of the cooling unit 170 in the water pump can be facilitated.

Although the preferred embodiment of the present invention has been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

In an electronic water pump provided with a cooling unit for vehicles according to the present invention, heat of cooling water which circulates through a pump casing is transferred to a cooling unit, that is, heat of cooling water is conducted from an upper cooling plate to a lower cooling plate through cooling pins. Thereby, the temperatures of a stator and a control board which controls the stator can be maintained at appropriate temperatures, thus preventing the stator and the control board from deteriorating due to high-temperature heat, thereby enhancing the efficiency of the engine. Furthermore, the present invention is configured such that assembly and installation of the cooling unit in the water pump can be facilitated.

A rotor is formed in such a way that a permanent magnet is installed in the rotor, and a cover provided with vanes, an impeller and a lower cover are integrated with each other by fusing. The permanent magnet strongly reacts to a magnetic field formed from a stator which surrounds the rotor, whereby the rotor is rotated. While the vanes rotate, the cooling water continuously circulates the water pump. By virtue of strong magnetic force overcoming flow resistance of the cooling water, there is no possibility of the rotor and the stator being desynchronized from each other. Therefore, superior torque performance of a BLDC motor can be maintained, and the durability thereof can be enhanced. Furthermore, heat dissipation performance of the stator can be increased.

In addition, first O-rings are respectively provided in upper and lower ends of a through hole, and a second O-ring is coupled to a pump casing and provided on a circumferential outer surface of an inner motor casing which is disposed in an outer motor casing. Thereby, a seal between the upper and lower ends of the inner motor casing can be maintained, and cooling water can be prevented from entering the stator of the BLDC motor or a control board, thus enhancing the safety.

The invention claimed is:

1. An electronic water pump for vehicles, having a pump casing through which cooling water passes, an outer motor casing coupled to a lower end of the pump casing, with a stator installed in the outer motor casing, and a motor cover coupled to a lower end of the outer motor casing, with a control board installed in the motor cover, the control board controlling the stator, the electronic water pump comprising:
an inner motor casing provided in the outer motor casing, with a shaft installed upright in a center of an insert hole formed in an upper surface of the inner motor casing, and a ring-shaped stator fitted over a circumferential outer surface of a lower end of the inner motor casing, the inner motor casing having a depression formed in the upper surface thereof, and at least one through hole formed vertically through the inner motor casing in an outer portion of the depression;
a rotor disposed in the insert hole so as to be rotatable around the shaft, with a permanent magnet provided in the rotor; and
a cooling unit comprising an upper cooling plate fitted over a circumferential outer surface of the rotor, the upper cooling plate being seated into the depression, at least one cooling pin coupled to an outer portion of the upper cooling plate, the at least one cooling pin being inserted into the at least one through hole and disposed in the outer motor casing, and a lower cooling plate coupled to a lower end of the cooling pin.

2. The electronic water pump of claim 1, wherein the rotor comprises:
a rotor body formed in a sleeve shape, the rotor body comprising a permanent magnet disposed in an insert depression formed in a lower surface of the rotor body, and a stopper fused to a the lower end of the rotor body to close the insert depression;
a cover provided with a plurality of vanes, the cover being integrally coupled to the rotor body in such a way that the vanes are fused to an upper surface of the rotor body; and
a bushing having a sleeve shape and provided in a circumferential inner surface of the rotor body.

3. The electronic water pump of claim 1, wherein the upper and lower ends of the at least one cooling pin are respectively fixed to the upper cooling plate and the lower cooling plate by calking or riveting.

4. The electronic water pump of claim 1, wherein the at least one cooling pin has a hollow structure.

5. The electronic water pump of claim 1, wherein the at least one cooling pin comprises a pole having a circular, polygonal or elliptical shape.

6. The electronic water pump of claim 1, further comprising:
first O-rings respectively provided in the upper and lower ends of the at least one through hole; and a second O-ring provided around the circumferential outer surface of the inner motor casing.

7. The electronic water pump of claim 1, wherein the cooling unit is made of copper or a material having a thermal conductivity equal to or higher a thermal conductivity of copper.

8. The electronic water pump of claim 2, wherein the fusion comprises ultrasonic fusion, high-frequency fusion or thermal fusion.

* * * * *